US011938513B1

(12) United States Patent
Shibuya et al.

(10) Patent No.: US 11,938,513 B1
(45) Date of Patent: Mar. 26, 2024

(54) ULTRASONIC-WAVE IRRADIATION UNIT

(71) Applicant: HONDA ELECTRONICS CO., LTD., Aichi (JP)

(72) Inventors: Nobunaga Shibuya, Aichi (JP); Yoshihiro Aoki, Aichi (JP)

(73) Assignee: HONDA ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 18/375,591

(22) Filed: Oct. 2, 2023

(30) Foreign Application Priority Data

Oct. 31, 2022 (JP) ................................ 2022-174110

(51) Int. Cl.
*B06B 1/06* (2006.01)
*B08B 3/12* (2006.01)

(52) U.S. Cl.
CPC .............. *B06B 1/0611* (2013.01); *B08B 3/12* (2013.01)

(58) Field of Classification Search
CPC ................................ B06B 1/0611; B08B 3/12
USPC ........................................................ 310/300
See application file for complete search history.

(56) References Cited

FOREIGN PATENT DOCUMENTS

| | | | | |
|---|---|---|---|---|
| CN | 1613273 | * 9/2011 | ........... | B06B 1/0618 |
| CN | 105324185 | * 2/2016 | ............... | B06B 3/00 |
| CN | 105307785 | * 11/2018 | .............. | B06B 1/06 |
| JP | 2019-058883 | 4/2019 | | |
| JP | 7171117 | 11/2022 | | |

* cited by examiner

*Primary Examiner* — Terrance L Kenerly
(74) *Attorney, Agent, or Firm* — Clark & Brody LP

(57) ABSTRACT

An ultrasonic-wave irradiation unit capable of reducing erosion and cleaning unevenness on a diaphragm and improving the joining strength of an ultrasonic transducer to the diaphragm includes a diaphragm, an ultrasonic transducer, a front-side resonating member, and a rear-side resonating member. A stud bolt protrudes from the non-radiation surface of the diaphragm. The transducer front plate of the ultrasonic transducer is joined to the non-radiation surface. The front-side resonating member is joined to the non-radiation surface and the bolt is inserted therethrough. The rear-side resonating member is provided at the tip of the bolt to fasten and secure the front-side resonating member. End-positioned resonators, mid-positioned resonators, and the ultrasonic transducer are arranged in a column. The rear-side resonating member of the end-positioned resonator is formed from a metal material with higher bending rigidity than the front-side resonating member.

4 Claims, 14 Drawing Sheets

FIG. 8

| Properties | Titanium alloy (Ti-6AL-4V) | Stainless steel (austenitic SUS304) | Aluminum alloy (extra super-duralumin A7075-T6) | Iron-base (Carbon steel for machine structural use S45C) |
| --- | --- | --- | --- | --- |
| Density ρ x $10^3$[kg/$m^3$] | 4. 43 | 7. 9 | 2. 8 | 7. 9 |
| Young's modulus [GPa] | 111 | 200 | 72 | 206 |
| Poisson's ratio | 0. 32 | 0. 30 | 0. 33 | 0. 31 |
| Slender rod longitudinal wave velocity c x$10^3$ [m/s] | 5. 00 | 5. 03 | 5. 07 | 5. 10 |
| Mechanical Q factor (for a uniformly shaped rod) | >10000 | 500~1000 By heat treatment | >5000 | 200~1000 |
| Fatigue strength $\sigma_F$ [MPa] based on $10^9$ cycles of data | 705 | 200 | 186 | 250~270 |
| Tensile strength [MPa] | 982~1240 | 500~610 | 500 | 570 |
| Hardness [HB] | 304 | 163 | 160 | 170 |
| Thermal conductivity [W/m/°C] | 7. 1 | 16. 3 | 121 | 62. 8 |
| Coefficient of thermal expansion x$10^{-6}$ [/°C] | 8. 8 | 17 | 23 | 12 |
| Magnetic properties | No | After solution treatment: No After cold working: Yes | No | Yes |
| Corrosion resistance | ◎ | ○ | × | × |

ULTRASONIC-WAVE IRRADIATION UNIT

TECHNICAL FIELD

The present invention relates to an ultrasonic-wave irradiation unit that irradiates ultrasonic waves from an ultrasonic transducer.

BACKGROUND ART

Conventionally, ultrasonic cleaning devices that clean objects (ultrasonic cleaning) by irradiating ultrasonic waves into cleaning solution have been put into practical use (for instance, refer to Patent Document 1). Ultrasonic cleaning, through a combination of physical effects caused by ultrasonic waves and chemical effects of the cleaning liquid, can efficiently clean even complex and intricate parts of the objects to be cleaned, making it indispensable in the manufacturing of precision machine parts, optical components, liquid crystal displays, semiconductors, etc.

Also, as shown in FIG. 16, the ultrasonic cleaning device 200 is equipped with a diaphragm 201, also referred to as an irradiation plate. The diaphragm 201, in many cases, doubles as the bottom of the cleaning tank 202 and is formed by a stainless-steel plate having a thickness of a few millimeters. Also, multiple bolted Langevin-type ultrasonic transducers 204 are joined to a non-irradiation surface 203 of the diaphragm 201. Moreover, the surface located on the opposite side of the non-irradiation surface 203 of the diaphragm 201 becomes an irradiation surface 205 for the ultrasonic waves. Then, according to the ultrasonic cleaning device 200 that emits, for example, ultrasonic waves of several tens of kilohertz, the cleaning of an object 207 to be cleaned is carried out using the powerful shockwaves caused by cavitation of the ultrasonic waves within a cleaning fluid 206.

PRIOR ARTS

Patent Document

Patent Document 1: Japanese Published Unexamined Patent Application No. 2019-058883 (See FIG. 1, etc.)

SUMMARY OF THE INVENTION

Problem to be Solved by the Invention

Incidentally, a circular transducer with a circular front plate in plan view is commonly used as the ultrasonic transducer 204. Circular transducers can be strongly joined to the non-irradiation surface 203 of the diaphragm 201 as they are screw-coupled using adhesive to the stud bolt welded to the diaphragm 201. However, when multiple circular transducers are joined to the diaphragm 201, a clearance occurs between adjacent circular transducers. As a result, problems such as damage (erosion 208) to the diaphragm 201 due to cavitation occurs in the clearance, and uneven cleaning due to variations in sound pressure occurs.

Therefore, it is also considered to use a rectangular transducer, as the ultrasonic transducer 204, which has a front plate of rectangular shape in a plan view. In this way, the rectangular transducers can be closely arranged on the diaphragm 201, thereby preventing erosion 208 from occurring on the diaphragm 201. Also, due to the close arrangement of the rectangular transducers, a uniform oscillation distribution can be achieved on the diaphragm 201, allowing a uniform sound pressure distribution to be realized, thus reducing cleaning unevenness.

However, conventional rectangular transducers cannot adopt a screw coupling using a stud bolt, and only adhesive is used for joining, thus weakening the joining strength. Especially under pressure conditions (decompression or pressurization) on the diaphragm 201, stress concentrates in the adhesive layer (bonding agent), potentially causing peeling at the adhesive layer.

Now, the inventors of the present invention are considering an ultrasonic transducer unit with the following structure. This unit employs a component that connects the transducer front plate in the bolted Langevin-type ultrasonic transducer and the front-side resonating member constituting the resonator with a coupler. Furthermore, in the state where the stud bolt of the diaphragm is inserted into the front-side resonating member, it is bolted and fixed by the rear-side resonating member constituting the resonator. However, in this unit, bending oscillation is easily excited in the rear-side resonating member, so there are concerns about heat generation and stress fracture depending on the oscillation level. Therefore, it is considered necessary to suppress bending oscillations for practical use.

The present invention has been made in view of the above problems, and its purpose is to provide an ultrasonic-wave irradiation unit that can reduce erosion and cleaning unevenness generated on the diaphragm and can enhance the joining strength of the ultrasonic transducer to the diaphragm. Another purpose of the present invention is to provide an ultrasonic-wave irradiation unit that can suppress bending oscillations generated during oscillation.

Means for Solving the Problem

To solve the above problems, the first aspect of the present invention refers to an ultrasonic-wave irradiation unit comprising; a diaphragm having an irradiation surface that irradiates ultrasonic waves, and a non-irradiation surface located on the opposite side of the irradiation surface, with a bolt protruding from the non-irradiation surface; a bolted Langevin-type ultrasonic transducer in which a transducer front plate is joined to the non-irradiation surface; a front-side resonating member joined to the non-irradiation surface and having a bolt insertion hole through which the bolt is inserted; and a rear-side resonating member is provided separately from the front-side resonating member at the tip of the bolt and is fastened and fixed to the bolt in a state where the front-side resonating member is held between the rear-side resonating member and the diaphragm, wherein the front-side resonating members and the rear-side resonating members constitute multiple resonators capable of integral oscillation, the side surface of the transducer front plate and the side surface of the front-side resonating member are connected to each other via a coupler that transmits the oscillation of the ultrasonic transducer to the resonators, multiple resonators, together with multiple ultrasonic transducers, are arranged in a column, consisting of end-positioned resonators located at the ends of the column and mid-positioned resonator located in the middle of the column, among the rear-side resonating members constituting the end-positioned resonators and the mid-positioned resonators, at least the rear-side resonating member constituting the end-positioned resonators is formed using a metal material with greater bending rigidity than the front-side resonating member.

Therefore, according to the first aspect of the present invention, multiple resonators are arranged such that multiple ultrasonic transducers constituting a column of transducers are held from both sides. This makes the ultrasonic transducers and resonators closely arranged with each other. As a result, a uniform oscillation distribution is more easily obtained on the diaphragm, thus making it possible to achieve a uniform sound pressure distribution and reduce cleaning unevenness. Furthermore, erosion occurring on the diaphragm can be reduced.

In addition, the transducer front plate and the front-side resonating member are connected via a coupler, and a bolt insertion hole through which a bolt protruding from the non-irradiation surface of the diaphragm is inserted is provided in the front-side resonating member. Therefore, by screwing the rear-side resonating member into the tip of the bolt that has passed through the bolt insertion hole, not only is the front-side resonating member firmly fixed to the diaphragm, but also the transducer front plate (and the ultrasonic transducer) connected to the front-side resonating member via the coupler is firmly fixed to the diaphragm. As a result, the joining strength of the ultrasonic transducer to the diaphragm increases.

In addition, the resonator oscillates due to the resonant phenomenon accompanying the oscillation of the ultrasonic transducer. Moreover, because the resonator has a simpler structure than the ultrasonic transducer, which is made up of several types of components, the manufacturing cost is generally lower. Therefore, by arranging the resonators separately from the ultrasonic transducers, instead of placing many ultrasonic transducers on the diaphragm, it is possible to manufacture a transducer unit at a low cost.

Moreover, among the rear-side resonating members that make up the end-positioned resonators and the mid-positioned resonators, at least the rearside resonating members that make up the end-positioned resonators are made of metal material with higher bending rigidity than the front-side resonating members. Therefore, it is possible to increase the bending strength in places where large bending stress is easily applied during oscillation, effectively suppressing bending oscillations. As a result, it is possible to prevent heat generation and stress fractures in that area, while also maintaining the resonant performance required of the resonator.

The second aspect of the present invention refers to an ultrasonic-wave irradiation unit according to the first aspect of the present invention, wherein the rear-side resonating member that makes up the end-positioned resonator is formed using metal material with Young's modulus of 100 GPa or more.

The third aspect of the present invention refers to an ultrasonic-wave irradiation unit according to the first aspect of the present invention, wherein the rear-side resonating member that makes up the end-positioned resonator is formed using a metal material with Young's modulus of 100 GPa or more, and the front-side resonating member, the transducer front plate and the coupler are formed using a metal material that is less dense and has a higher thermal conductivity than the metal material used in the rear-side resonating member that forms the end-positioned resonator.

The fourth aspect of the present invention refers to an ultrasonic-wave irradiation unit according to any one of the first to third aspects of the present invention, wherein the length in the height direction of the rear-side resonating member is ¼ or more of the length in the height direction of the resonator, of which a front face of the rearside resonating member and a rear face of the front-side resonating member make contact with each other.

Effects of the Invention

As detailed above, according to the first to fourth aspects of the present invention, it is possible to reduce erosion occurring on the diaphragm and unevenness in cleaning, while increasing the joining strength of the ultrasonic transducer to the diaphragm. Furthermore, it is possible to suppress bending oscillation that occurs during oscillation.

BRIEF DESCRIPTION OF THE DRAWINGS

FIG. 8 is the table comparing the properties of various metal materials used for components constituting the ultrasonic-wave irradiation unit.

FIG. 9 (*b*) is the diagram showing the oscillation displacement analysis results of Comparative Example 2.

MODES FOR CARRYING OUT THE INVENTION

First Embodiment

Hereinafter, the first embodiment of the present invention, which is embodied in an ultrasonic cleaning device, will be explained in detail, based on FIG. 1 to FIG. 9.

Figure 1:
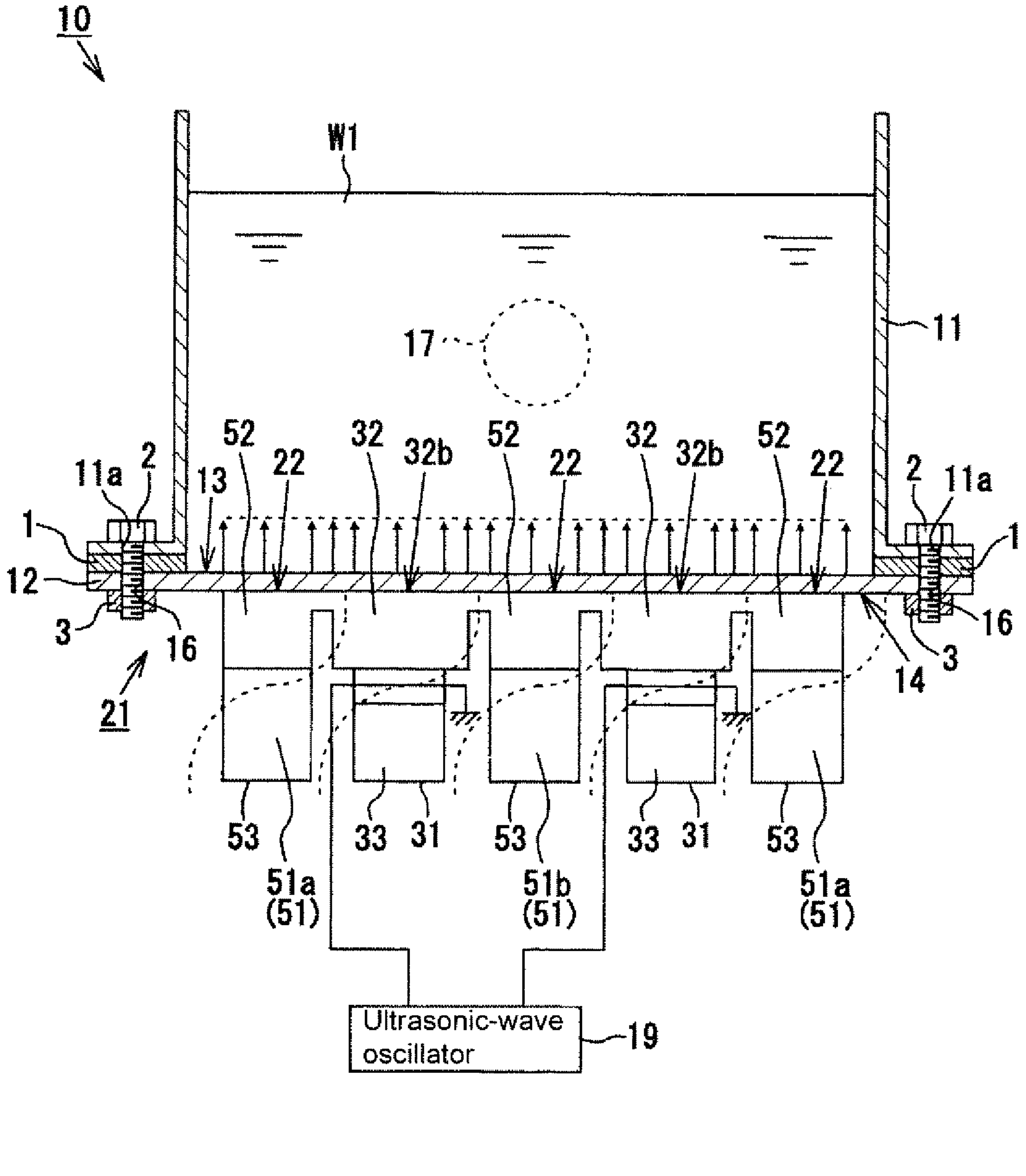
FIG. 1 is the schematic configuration diagram of an ultrasonic cleaning device as the first embodiment.
Figure 2:
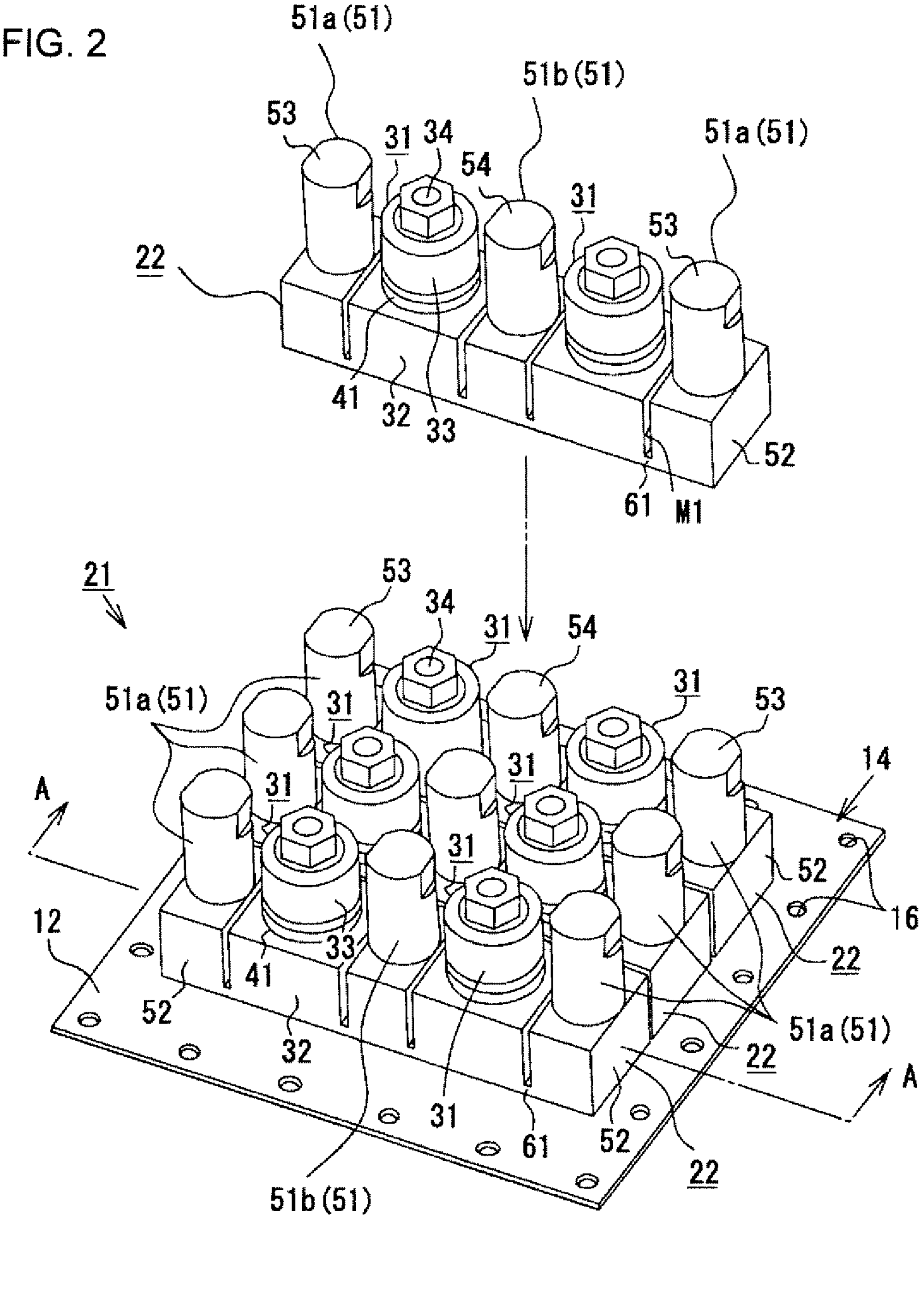
FIG. 2 is the perspective view of a diaphragm-type ultrasonic-wave irradiation unit as the first embodiment.
Figure 3:
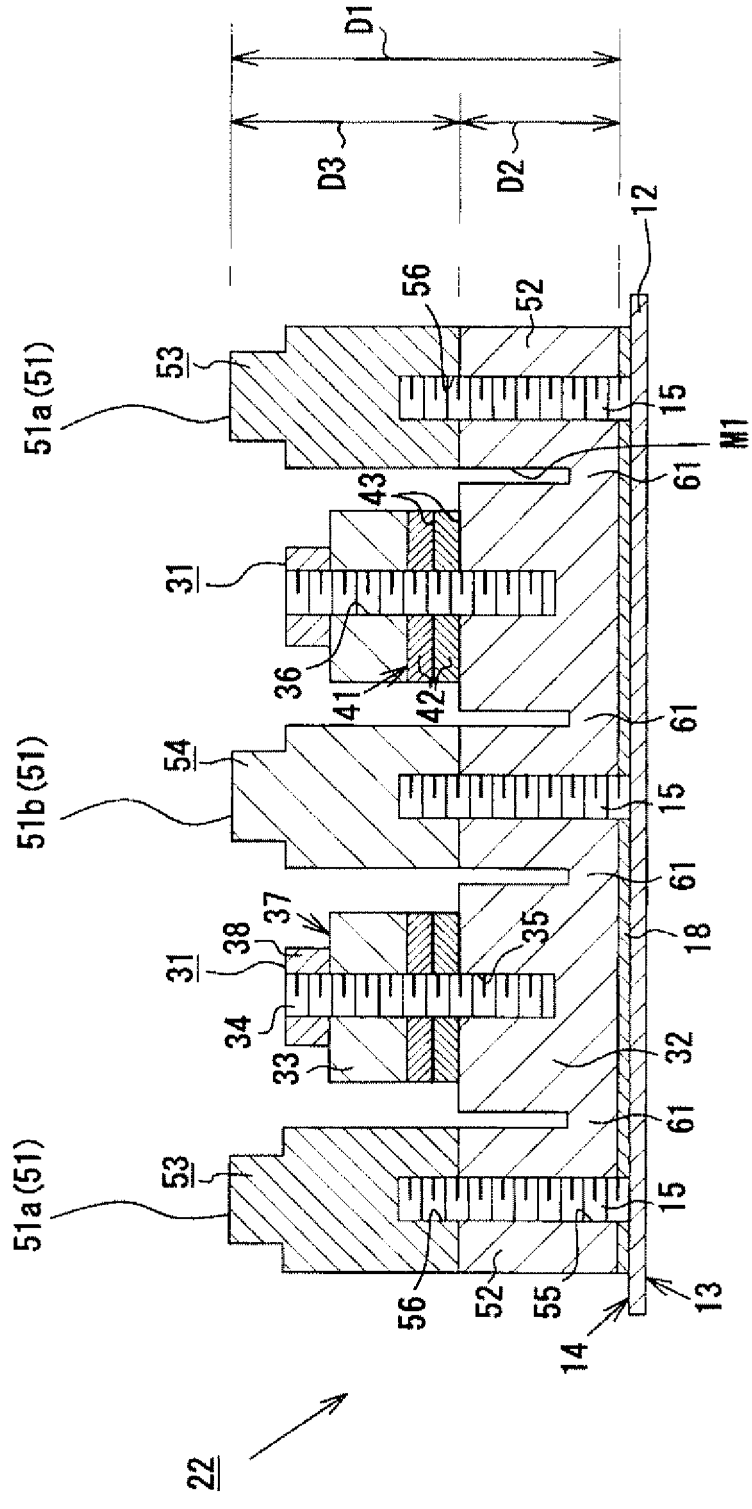
FIG. 3 is the cross-sectional view along a line A-A in FIG. 2.

As shown in FIG. 1 to FIG. 3, the ultrasonic cleaning device 10 is equipped with a metal cleaning tank 11 for storing cleaning fluid W1 and an ultrasonic-wave irradiation unit 21. A plurality of bolt holes 11*a* are provided at the lower end of the cleaning tank 11. Moreover, the ultrasonic-wave irradiation unit 21 includes a diaphragm 12 and three transducer units 22. The diaphragm 12 forms the bottom of the cleaning tank 11 and is a nearly rectangular panel-shaped metal plate (stainless steel plate in this embodiment) with dimensions of 220 mm in length, 220 mm in width, and 2.5 mm in thickness. That is, the ultrasonic-wave irradiation unit 21 of this embodiment is a diaphragm type of ultrasonic-wave irradiation unit in which the diaphragm 12 is placed at the lower end of the cleaning tank 11 through a packing 1 and is tightened with a bolt 2 and a nut 3. The diaphragm 12 has an irradiation surface 13 that irradiates ultrasonic waves and a non-irradiation surface 14 located on the opposite side of the irradiation surface 13. On the non-irradiation surface 14 of the diaphragm 12, a plurality of stud bolts 15 (see FIG. 3) are protruded at equal intervals. A plurality of fixing holes 16 are provided all around the outer periphery of the diaphragm 12.

Figure 4:
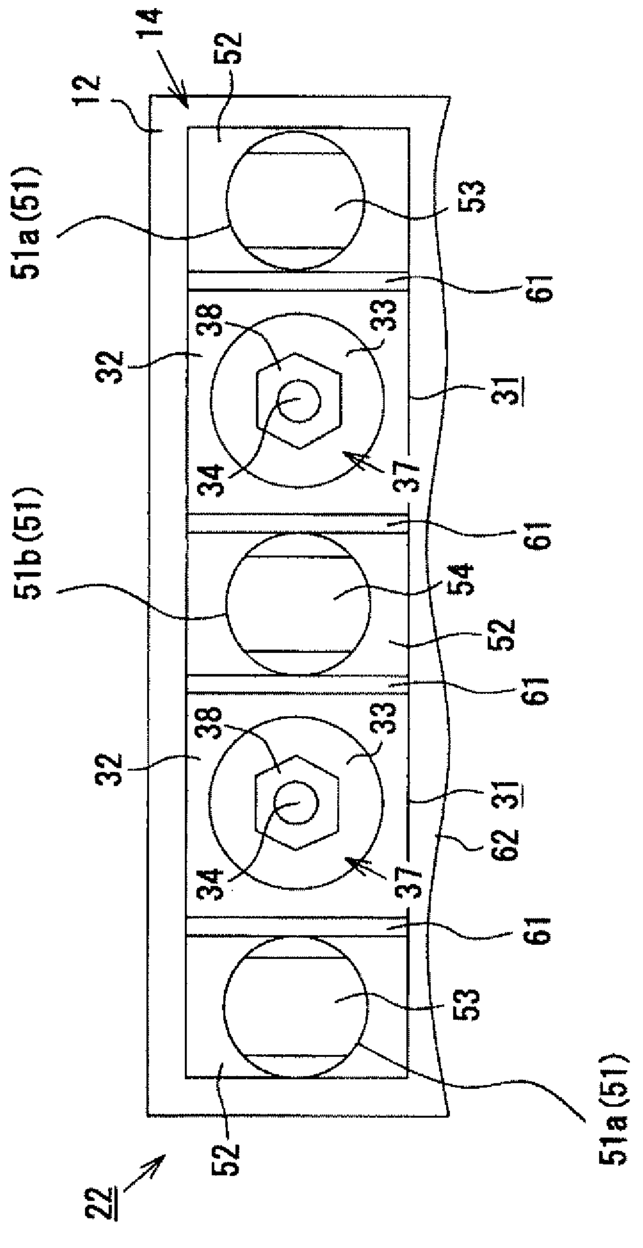
FIG. 4 is the plan view of a transducer unit constituting the ultrasonic-wave irradiation unit.

As shown in FIG. 3 and FIG. 4, each transducer unit 22 includes a plurality of ultrasonic transducers 31 (two in this embodiment) that are joined to the diaphragm 12, and a plurality of resonators 51 (three in this embodiment) that are also joined to the diaphragm 12. The ultrasonic transducers 31 and the resonators 51 are arranged alternately. The three resonators 51 are arranged in a column together with the two ultrasonic transducers 31. In this embodiment, the resonator 51 located at the end of the column is referred to as the "end-positioned resonator 51*a*", and the resonator 51 located in the middle of the column is referred to as the "mid-positioned resonator 51*b*". Moreover, the ultrasonic cleaning device 10 of this embodiment is a device that cleans the surface of the object 17 to be cleaned (see FIG. 1) contained in the cleaning tank 11 by irradiating ultrasonic waves from each ultrasonic transducer 31 to the cleaning liquid W1 in the cleaning tank 11.

As shown in FIG. 1 to FIG. 5, each ultrasonic transducer 31 is a device for irradiating ultrasonic waves. Each ultrasonic transducer 31 is composed of a transducer front plate 32, a transducer rear plate 33, a driving part 41, and a transducer assembly bolt 34. The transducer front plate 32 is positioned at the front-end side of the ultrasonic transducer 31. The transducer front plate 32 has a square shape in plan view, with a side length set to 45 mm in this embodiment. And the irradiation surface of the transducer front plate 32 is joined to the non-protruding bolt region R2 on the non-irradiation surface 14 of the diaphragm 12 via an adhesive 18 such as an epoxy resin (see FIG. 5).

The transducer rear plate 33 is positioned at the rear-end side of the ultrasonic transducer 31. The driving part 41 is formed by alternately stacking two piezoelectric elements 42 and two electrode plates 43 and is held between the transducer front plate 32 and the transducer rear plate 33. The piezoelectric element 42 is annular, and the electrode plate 43 is substantially annular with a tab part in a part, so the driving part 41 has a bolt insertion hole 44 penetrating its own center. Each piezoelectric element 42 is polarized in the thickness direction.

While not particularly limited, the piezoelectric elements 42 in this embodiment may be formed using a ceramic piezoelectric material that includes Pb (lead), such as lead zirconate titanate (PZT). Alternatively, the piezoelectric elements 42 may be formed using lead-free ceramic piezoelectric materials, specifically, alkali niobate ceramic piezoelectric materials.

As shown in FIG. 3, a female screw hole 35 that extends along the height direction of the transducer front plate 32 (in the up-down direction as shown in FIG. 3) is formed in the center of the transducer front plate 32. The female screw hole 35 does not penetrate through the transducer front plate 32. In other words, the female screw hole 35 opens only on the rear face of the transducer front plate 32. On the other hand, the front face of the transducer front plate 32 is in a flat state without any holes, and it makes surface contact with the non-irradiation surface 14 of the diaphragm 12. The female screw hole 35 is connected to the bolt insertion hole 44 of the driving part 41. Meanwhile, a through hole 36 extending along the height direction of the transducer rear strike plate 33 (in the up-down direction as shown in FIG. 3) is formed in the center of the transducer rear strike plate 33. The through hole 36 opens at its front face, communicates with the bolt insertion hole 44, and further opens at its rear face 37. The transducer assembly bolt 34, which has male screws formed on its outer circumferential surface, is inserted from the transducer rear strike plate 33 side, and its tip reaches the female screw hole 35 on the transducer front plate 32 side through the through hole 36 and the bolt insertion hole 44. In other words, the tip of this transducer assembly bolt 34 stops midway through the transducer front plate 32 and does not reach the diaphragm 12. This transducer assembly bolt 34 is screwed into the female screw hole 35. By screwing a nut 38 onto the protruding portion of the transducer assembly bolt 34 that has penetrated through the transducer rear strike plate 33, the transducer front plate 32, the driving part 41, and the transducer rear strike plate 33 are tightened and fixed together, thereby being integrated. Any metal materials can be used for forming the transducer assembly bolt 34 and nut 38, but in this case, stainless steel is used.

As shown in FIG. 1 to FIG. 5, each ultrasonic transducer 31 in this embodiment is a longitudinal oscillation bolted Langevin-type transducer that resonates with a longitudinal oscillation component in the axial direction being $\lambda/2$ ($\lambda$: longitudinal oscillation wavelength)—this is the primary longitudinal oscillation mode (with a resonant frequency of 28 kHz when resonating alone). Each ultrasonic transducer 31 is a transducer that oscillates at the same frequency as each other.

Also, as shown in FIG. 1, an ultrasonic-wave oscillator 19 is connected to each ultrasonic transducer 31. The ultrasonic-wave oscillator 19 supplies high-frequency power to continuously oscillate each ultrasonic transducer 31. Each ultrasonic transducer 31 is driven by this high-frequency power, and by each ultrasonic transducer 31, ultrasonic waves of 25 kHz (the resonant frequency when the ultrasonic transducer 31 is joined to the diaphragm 12) are irradiated into the cleaning liquid W1 in the cleaning tank 11. According to this embodiment, the output of the ultrasonic waves is set at 250 W, but this is not particularly limited and can be set arbitrarily.

As shown in FIG. 1 to FIG. 5, each resonator 51 in this embodiment is a resonator that resonates at the same frequency (single resonant frequency of 28 kHz) and longitudinal oscillation mode as the ultrasonic transducer 31. Each resonator 51 is constituted by a front-side resonating member 52 and rearside resonating members 53 and 54, which are provided separately from the front-side resonating member 52. In this embodiment, the rearside resonating member constituting the end-positioned resonator 51*a* is designated with the part number "53", and the rear-side resonating member constituting the mid-positioned resonator 51*b* is designated with the part number "54", thus distinguishing the two. The front-side resonating member 52 and rear-side resonating members 53 and 54 constitute a single resonator 51 which is capable of integral oscillation. In other words, the resonator 51 in this embodiment is not made up of one part but is made up of two parts dividable in the front-and-back direction as described above. The rear surface of the front-side resonating member 52 and the front surfaces of the rear-side resonating members 53 and 54 are all flat and in face-to-face contact with each other.

The front-side resonating member 52 functions as an emitter for emitting ultrasonic waves. The front-side resonating member 52 is positioned on the front-end side of the resonator 51. The front-side resonating member 52 is rectangular in plan view, with dimensions of 45 mm×25 mm in this embodiment. Therefore, the maximum length of one side of the front-side resonating member 52 is equal to the length of one side (i.e., 45 mm) of the transducer front plate 32 of the ultrasonic transducer 31. Furthermore, in the center of the front-side resonating member 52, a bolt insertion hole 55 for the stud bolt 15 is provided so as to extend along the height direction of the front-side resonating member 52. Then, the front-side resonating member 52 is joined to the bolt protruding area R1 on the non-irradiation surface 14 of the diaphragm 12 via an adhesive 18 on the front side (see FIG. 5).

As shown in FIG. 1 to FIG. 5, the rear-side resonating members 53 and 54 are positioned at the rear-end side of the resonator 51. Also, the rear-side resonating member 53 is circular in plan view, with an outer diameter of 25 mm in this embodiment. The rear-side resonating member 53 is located at the tip of the stud bolt 15 that passes through a bolt insertion hole 55. In the center of the rear-side resonating member 53, a non-through female screw hole 56, into which the stud bolt 15 is screwed, is provided to extend along the height direction of the rear-side resonating members 53 and 54. Thus, by screwing the tip of the stud bolt 15 in the female screw hole 56 of this rear-side resonating member 53, the front-side resonating member 52 is clamped and fixed between the rear-side resonating member 53 and the diaphragm 12. In other words, in this embodiment, the rear-side resonating member 53 has not only the function as a component of the resonator 51 but also the function as a nut. In this embodiment, the front-side resonating member 52 and the rearside resonating members 53 and 54 make contact with each other at the joint surfaces, and in this state, both resonating members 52, 53, and 54 are tightened and fixed. During bolt tightening of the front-side resonating member 52 and the rear-side resonating members 53 and 54, it is desirable that the contact stress distribution at the joint surface be uniform, hence the surface contact as mentioned above is preferable. By the way, if the contact condition at the joint surface is poor, there is a risk that the mechanical Q-factor will decrease due to heat generation at the joint surface, and the resonator 51 may not function properly.

Here, the length D2 in the height direction of the front-side resonating member 52 and the length D3 in the height direction of the rear-side resonating members 53 and 54 can be set arbitrarily and are not particularly limited. However, the length D3 of the rear-side resonating members 53 and 54 is set to be, e.g., ¼ or more of the length D1 in the height direction of the resonator 51. This is because it becomes easier to obtain sufficient tightening force when bolting within this size range. The above length D3 may be ⅓ or more of the above length D1, or even ½ or more. Also, the length D1 in the height direction of the resonator 51 can be set arbitrarily and is not particularly limited. Still, in this embodiment, it is somewhat longer than the length in the height direction of the ultrasonic transducer 31. Therefore, the upper end of the rear-side resonating member 53 is positioned higher than the upper end of the ultrasonic transducer 31, and a tool engagement section with a non-circular cross-sectional shape having flat surfaces at two opposing points on the peripheral surface is formed. In other words, the upper end of the rear-side resonating member 53 has a cross-sectional shape that makes it easy to engage the tip of a tool when rotating and screwing using a tool.

As shown in FIG. 3 and FIG. 4, a part of the side surface of the transducer front plate 32 and a part of the side surface of the front-side resonating member 52 are connected via a coupler 61. The coupler 61 exists in correspondence with the place where the notch M1 is located. The coupler 61 refers to a connection portion formed in a thinner belt-like shape than the surrounding adjacent members (such as the transducer front plate 32 and the front-side resonating member 52). The coupler 61 plays not only a role in couplers but also plays a role in transmitting the oscillations of the ultrasonic transducer 31 to the resonator 51. In this embodiment, the coupler 61 connects the front end (lower end, as shown in FIG. 3) of the side surface of the transducer front plate 32 and the front end (lower end, as shown in FIG. 3) of the side surface of the front-side resonating member 52. And the front side of the coupler 61 is also joined to the non-irradiation surface 14 of the diaphragm 12 via the adhesive 18. Moreover, in the transducer unit 22 of this embodiment, two transducer front plates 32, three front-side resonating members 52, and four couplers 61 are integrally formed.

The front-side resonating member 52, which is rectangular in plan view, has a long side parallel to the thin belt-shaped coupler 61 and a short side perpendicular to the coupler 61. The length of the long side of the front-side resonating member 52 is not particularly limited, but in this embodiment, it is equal to the size of one side of the transducer front plate 32. Also, the sum of the dimensions of the length of the short side of the front-side resonating member 52 and the width of the coupler 61 is not particularly limited. Still, it is preferable to be a length of ¼ or less of the vertical oscillation wavelength of the ultrasonic transducer 31. The reason for this is that when the sum of the dimensions is within the range of this length, the resonator 51 can efficiently function as a resonator that makes uniform vertical oscillations.

Next, the metal material used for the members constituting the ultrasonic-wave irradiation unit 21 is explained, referring to FIG. 8. The table in FIG. 8 compares the properties of various metal materials.

In this embodiment, each front-side resonating member 52, each transducer front plate 32, and each coupler 61 are formed from a single metal block, so they are made of the same metal material. Here, as the metal material forming the front-side resonating member 52, the transducer front plate 32, and the coupler 61, a material that has a large mechanical Q factor (i.e., small mechanical oscillation loss), low density (i.e., lightweight), and high thermal conductivity (i.e., excellent heat dissipation) is preferred. Specifically, an aluminum alloy (extra super duralumin A7075-T6) is selected in this embodiment. An aluminum alloy other than extra super duralumin A7075-T6 (for example, A6063, etc.) may also be chosen since choosing a material with a large mechanical Q factor (i.e., small mechanical oscillation loss) and low density (i.e., lightweight) makes it possible to improve oscillation performance of the ultrasonic transducer 31 and the resonator 51. At the same time, selecting a material with high thermal conductivity (i.e., excellent heat dissipation) reduces the loss of electrical energy input to the ultrasonic transducer 31, further improving cleaning efficiency. The rear-side resonating member 54 constituting the mid-positioned resonator 51*b*, is also made of an aluminum alloy in this embodiment.

According to Table 8, the value of Young's modulus, which relates to the bending rigidity of the aluminum alloy (extra super duralumin A7075-T6), is 72 GPa. Also, among the rearside resonating member 53 constituting the end-side resonator 51*a*, and the rear-side resonating member 54 constituting the mid-positioned resonator 51*b*, the rear-side resonating member 53 constituting the end-side resonator 51*a* is formed using a metal material with greater bending rigidity than the front-side resonating member 52. Specifically, stainless steel (Young's modulus: 200 GPa) is selected as the metal material forming the rear-side resonating member 53 constituting the end-side resonator 51*a*. The rear-side resonating member 53 that constitutes the end-side resonator 51*a* is preferably formed using a metal material with Young's modulus of 100 GPa or more, and stainless steel meets this condition. In addition to this, it is, of course, permissible to choose iron-based metals such as carbon steel S45C for mechanical structures (Young's modulus: 206 GPa), or titanium alloys such as Ti-6Al-4V (Young's modulus: 111 GPa). Incidentally, the bending rigidity is expressed as the product E·I of Young's modulus of the material E and the cross-sectional secondary moment I. Therefore, the larger the Young's modulus of the material, the more it can suppress bending oscillation.

The front-side resonating member 52, the transducer front plate 32, and the coupler 61 are preferably formed using a metal material with a smaller density than the rear-side resonating member 53 that constitutes the end-side resonator 51*a*. For example, suppose the metal material forming the rear-side resonating member 53 is stainless steel (density: $7.9\times10^3$ [kg/$m^3$]). In that case, the aluminum alloy with a density of $2.8\times10^3$ [kg/$m^3$] satisfies the favorable conditions and can thus be used as the material to form the components above. In addition, the titanium alloy (Ti-6Al-4V) with a density of $4.43\times10^3$ [kg/$m^3$] also satisfies the favorable conditions, so it can be used as the material to form the components above. Furthermore, the front-side resonating member 52, the transducer front plate 32 and the coupler 61 should preferably be formed using a metal material with a more significant thermal conductivity than the rear-side resonating member 53 that constitutes the end-side resonator 51*a*. For example, if the metal material forming the rear-side resonating member 53 is stainless steel (thermal conductivity: 16.3 [W/m/C]), the aluminum alloy with a thermal conductivity of 121 [W/m/C] satisfies the favorable conditions and can therefore be used as the material to form the components above.

Also, the oscillating assembly bolt 34 and stud bolt 15 are formed using a metal material with high bending rigidity. In this embodiment, stainless steel, which is a metal material with Young's modulus of 100 GPa or more, is selected. The length and diameter of the stud bolt 15 are not particularly limited and can be arbitrarily set. The diameter of the stud bolt 15 is, for example, preferably 20% or more of the outer diameter of the rear-side resonating members 53 and 54, and more preferably 30% or more. This is because if the stud bolt 15 is too thin, the contact stress distribution at the joint surface of the front-side resonating member 52 and the rear-side resonating members 53 and 54 becomes uneven, which can easily lead to heat generation, a cause of reduction in mechanical Q factor.

The diameter of the stud bolt 15 should preferably be 80% or less of the shorter dimension between the short edge of the front-side resonating member 52 and the outer diameter of the rear-side resonating members 53 and 54, and more preferably 70% or less. That is, if the stud bolt 15 is too thick, the thickness of the resonating members 52, 53, and 54 becomes thin, which may lead to a stress fracture of the resonating members 52, 53, and 54.

The screwing length of the stud bolt 15 in relation to the female screw hole 56 of the rear-side resonating members 53, 54 should preferably be at least larger than the diameter of the stud bolt 15, and particularly it is desirable to be 1.2 times or more the diameter of the stud bolt 15 since it becomes easier to obtain sufficient tightening force when tightening bolts within this dimensional range.

Next, operations of the ultrasonic cleaning device 10 in this embodiment will be described.

First, the ultrasonic cleaning device 10 is driven, and high-frequency power is supplied from the ultrasonic-wave oscillator 19 to multiple ultrasonic transducers 31, thus continuously oscillating each ultrasonic transducer 31. As a result, ultrasonic waves are irradiated from the ultrasonic transducer 31 into the cleaning solution W1. At this time, cavitation occurs in the cleaning solution W1 along with the irradiation of ultrasonic waves, and the objects 17 to be cleaned are cleaned by the impact of the cavitation bursts.

Figure 5:
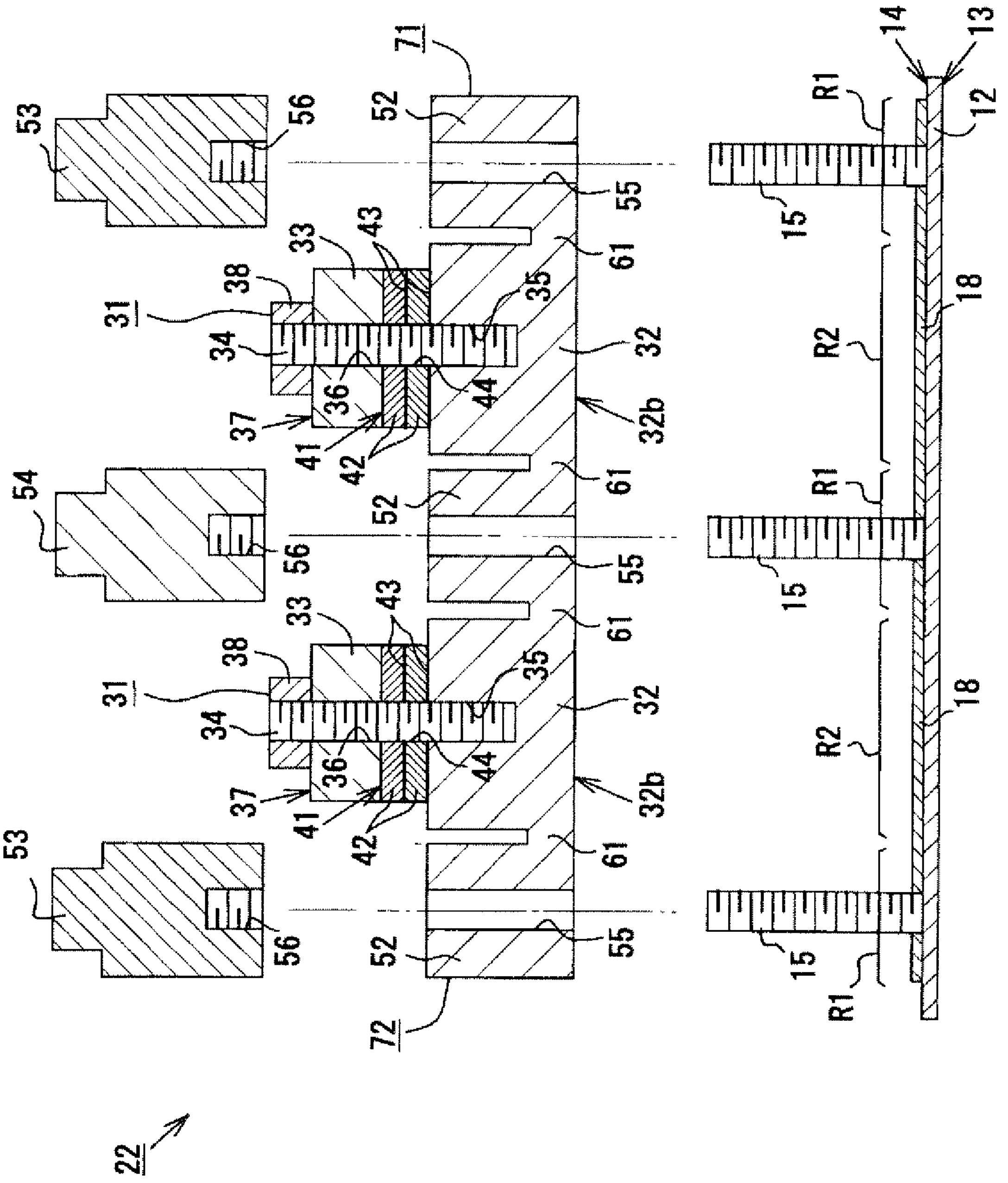
FIG. 5 is the exploded cross-sectional view of the ultrasonic-wave irradiation unit for explaining the assembly procedure.
Figure 6:
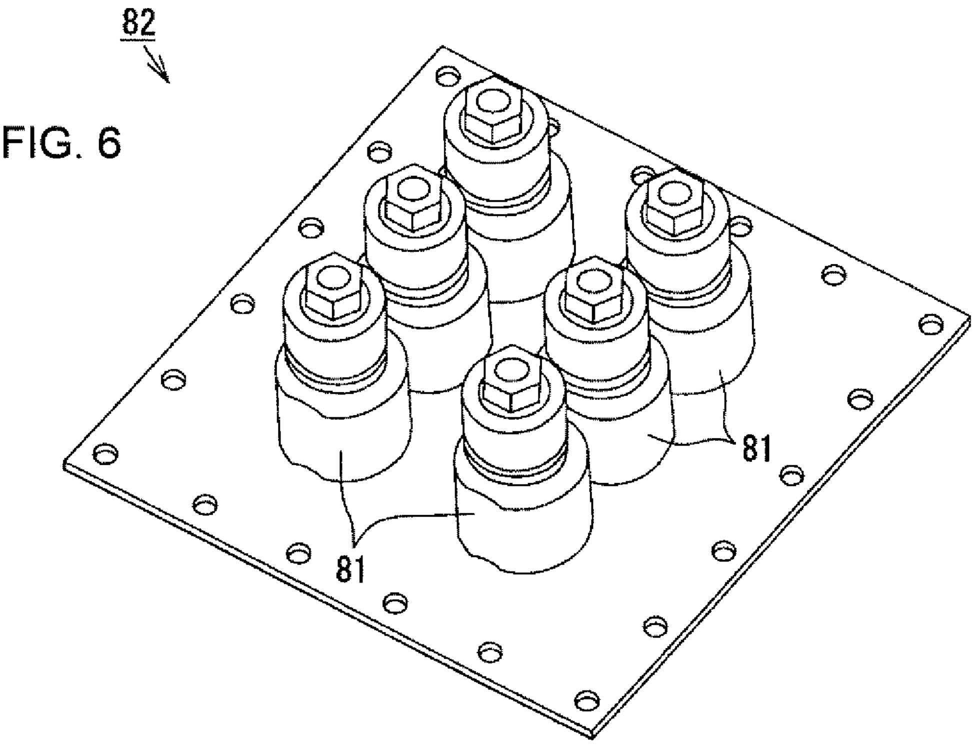
FIG. 6 is the perspective view of a diaphragm-type ultrasonic-wave irradiation unit according to Comparative Example 1.
Figure 7:
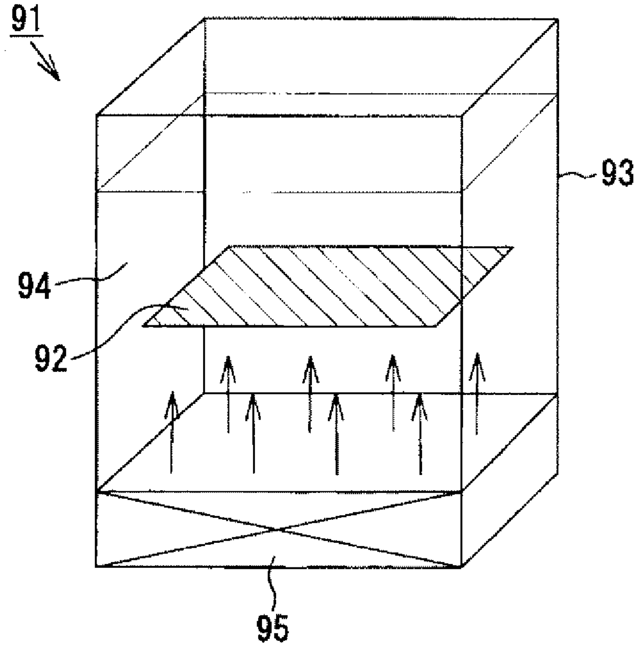
FIG. 7 is the schematic perspective view of an ultrasonic cleaning device used for the analysis of sound pressure distribution.

Next, the assembly method of the ultrasonic-wave irradiation unit 21 will be explained based on FIG. 5.

First, after machining an aluminum alloy block (grooving, end-face machining, screw machining, etc.) and then polishing the end face, a front base 71 consisting of a transducer front plate 32, a front-side resonating member 52, and a coupler 61 is fabricated. Next, the transducer mounting bolt 34 is screwed into the female screw hole 35 provided in the transducer front plate 32. Furthermore, for the transducer mounting bolt 34, after alternately attaching two electrode plates 43 and two piezoelectric elements 42, the transducer rear plate 33 is attached. Then, by screwing the nut 38 onto the protruding portion of the bolt 34 that has passed through the transducer rear plate 33, the transducer front plate 32, the electrode plate 43, the piezoelectric element 42, and the transducer rear plate 33 are tightened together to form the ultrasonic transducer 31.

In addition, after welding multiple stud bolts 15 to the non-irradiation surface 14 of the diaphragm 12, an adhesive 18 is applied to the non-irradiation surface 14. Then, multiple (in this embodiment, three) transducer units 22 are externally inserted onto the stud bolts 15 of the diaphragm 12. Furthermore, the rear-side resonating member 53 is screwed onto the protruding portion (tip) of the stud bolt 15 that has passed through the front-side resonating member 52. By doing this, the ultrasonic-wave irradiation unit 21 is completed. At this time, the front base 71 is joined and fixed to the non-irradiation surface 14 of the diaphragm 12 by the adhesive force of the adhesive 18 and the tightening force of the rear-side resonating members 53, 54 on the stud bolts 15.

Next, the evaluation test of the ultrasonic-wave irradiation unit 21 and its results will be described.

First Evaluation Test

In the first evaluation test, measurement samples were prepared as follows. An ultrasonic-wave irradiation unit 21, identical to that in this embodiment (see FIG. 2), was designed and used as an example. Additionally, an ultrasonic-wave irradiation unit 82, from which the resonator 51 of the ultrasonic-wave irradiation unit 21 of this embodiment was omitted, was prepared and used as Comparative Example 1 (see FIG. 6). Note that in Comparative Example 1, the ultrasonic transducer 31 was replaced with an ultrasonic transducer 81 (a circular transducer) equipped with a circular transducer front plate in plan view.

Next, the oscillation distribution in the diaphragm of the ultrasonic-wave irradiation unit of each measurement sample (Example, Comparative Example 1) in a water-loaded condition was analyzed using the well-known finite element method.

As a result, in Comparative Example 1, it was confirmed that fluctuations occurred in the oscillation distribution in a specific region (the rear part of the ultrasonic transducer 81) of the diaphragm. On the other hand, in the Example, it was confirmed that there were no fluctuations in the oscillation distribution in the specific region, meaning that the oscillation distribution was uniform.

In addition, an ultrasonic cleaning apparatus 91 (refer to FIG. 7) was fabricated using the ultrasonic-wave irradiation unit of each measurement sample (Example, Comparative Example 1), and the fabricated ultrasonic cleaning apparatus 91 was used to clean an object 92 to be cleaned. Specifically, after storing cleaning liquid 94 in the cleaning tank 93, the object 92 to be cleaned was housed in cleaning tank 93. In this case, a stainless-steel plate was used as the object 92 to be cleaned. Next, ultrasonic waves with a frequency of 25 kHz and an output of 250 W were irradiated towards the cleaning solution 94 from the ultrasonic transducer 95 of the ultrasonic wave irradiation unit to clean the object 92 to be cleaned in the cleaning solution 94. Then, for each measurement sample, the sound pressure distribution on the surface of object 92 to be cleaned was analyzed.

As a result, in Comparative Example 1, it was confirmed that unevenness occurred in the sound pressure distribution on the surface of the object 92 to be cleaned. On the other hand, in the Example, it was confirmed that unevenness did not occur in the sound pressure distribution on the surface of the object 92 to be cleaned; that is, the sound pressure distribution became uniform.

Next, in each measurement sample (Example, Comparative Example 1), the cleaning tank 93 of the ultrasonic cleaning device 91 was depressurized by 100 kPa. Then, using the conventionally known finite element method analysis, the amount of deformation of the diaphragm possessed by the ultrasonic-wave irradiation unit was analyzed. Also, the stress applied to the adhesive used to join the ultrasonic transducer and the resonator to the diaphragm was analyzed.

As a result, in Comparative Example 1, it was confirmed that when the cleaning tank 93 was depressurized, the diaphragm's maximum displacement (maximum value of deformation) reached about 320 μm. On the other hand, in the Example, it was confirmed that even if the cleaning tank 93 was depressurized, the maximum displacement of the diaphragm was only about 40 μm. In other words, it was confirmed that the amount of deformation in the Example was about one-eighth of that in Comparative Example 1.

Also, in Comparative Example 1, it was confirmed that when the cleaning tank 93 was depressurized, the maximum stress applied to the adhesive reached about 26 MPa. In this case, it was confirmed that since it exceeded the allowable stress of the adhesive (23 MPa), the ultrasonic transducer peeled off at the adhesive part. On the other hand, in the Example, it was confirmed that even if the cleaning tank 93 was depressurized, the maximum stress applied to the adhesive was only about 11 MPa. In this case, it was confirmed that since it is about half of the allowable stress of the adhesive, peeling does not occur at the adhesive part.

From the above, it has been proven that if a transducer unit equipped with both an ultrasonic transducer and a resonator is joined to the diaphragm, the oscillation distribution of the irradiation surface of the diaphragm is uniform with no bending oscillation component, which makes it less prone to cause erosion, thus proving the diaphragm to be long-lived. Also, since the sound pressure distribution on the surface of object 92 to be cleaned becomes uniform, it has been proven that uniformly cleaning is possible. Furthermore, it has been proven that the ultrasonic transducer itself functions as a "resonant type of reinforcement plate," has pressure resistance against depressurization, and is ideal as an ultrasonic transducer for depressurized cleaning.

Second Evaluation Test

In the second evaluation test, Example and Comparative Example 2 were set, and the oscillation mode was analyzed and compared when the metal material of the rear-side resonating members 53 and 54 was changed. The Example consists of the rear-side resonating member 53, made of stainless steel that constitutes the end-positioned resonator 51*a*, and a rear-side resonating member 54, made of aluminum alloy that constitutes the mid-positioned resonator 51*b*. Comparative Example 2 essentially has the same configuration as the Example, but all the rear-side resonating members 53 and 54 are made of an aluminum alloy. Then, the irradiation surface 13 side of the diaphragm 12 was set to be a water-loaded state, and the deformation amount of each part of the unit was analyzed by the finite element method for driving conditions with a driving frequency of 25.8 kHz and an output of 250 W.

Figure 9:
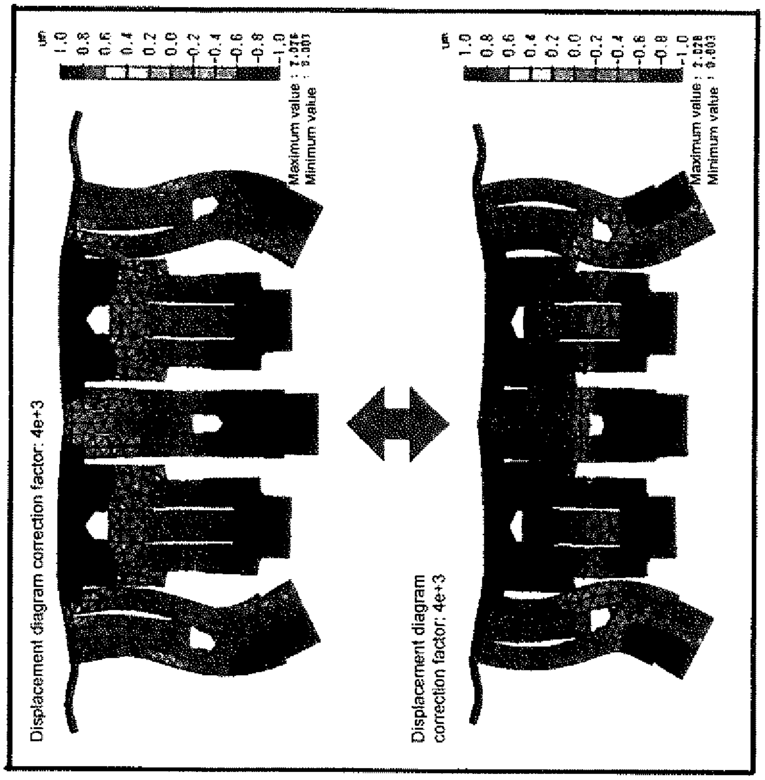
FIG. 9 (*a*) is the diagram showing the oscillation displacement analysis results of an example.
Figure 9:
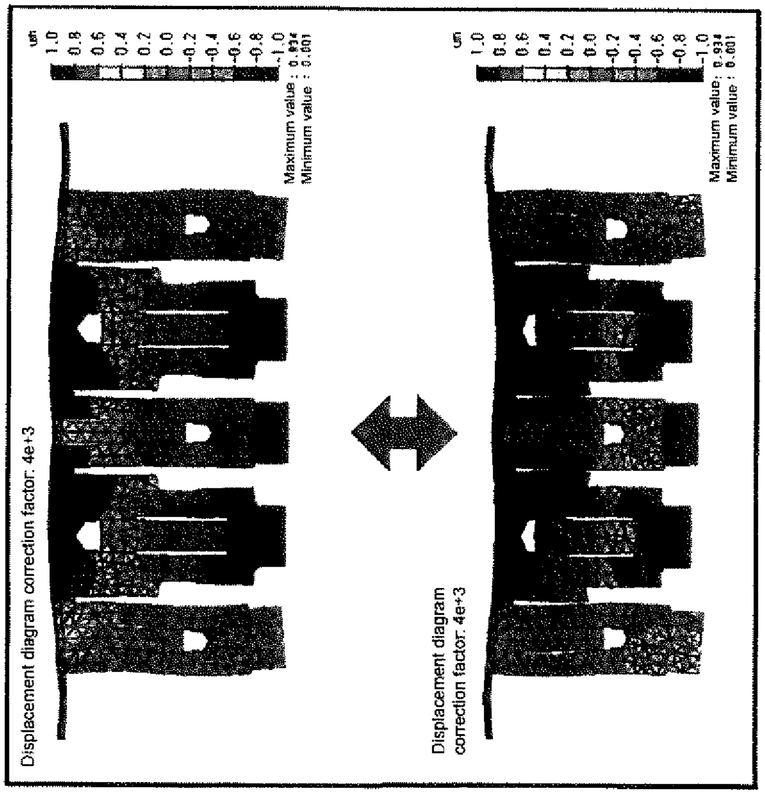
Figure 10:
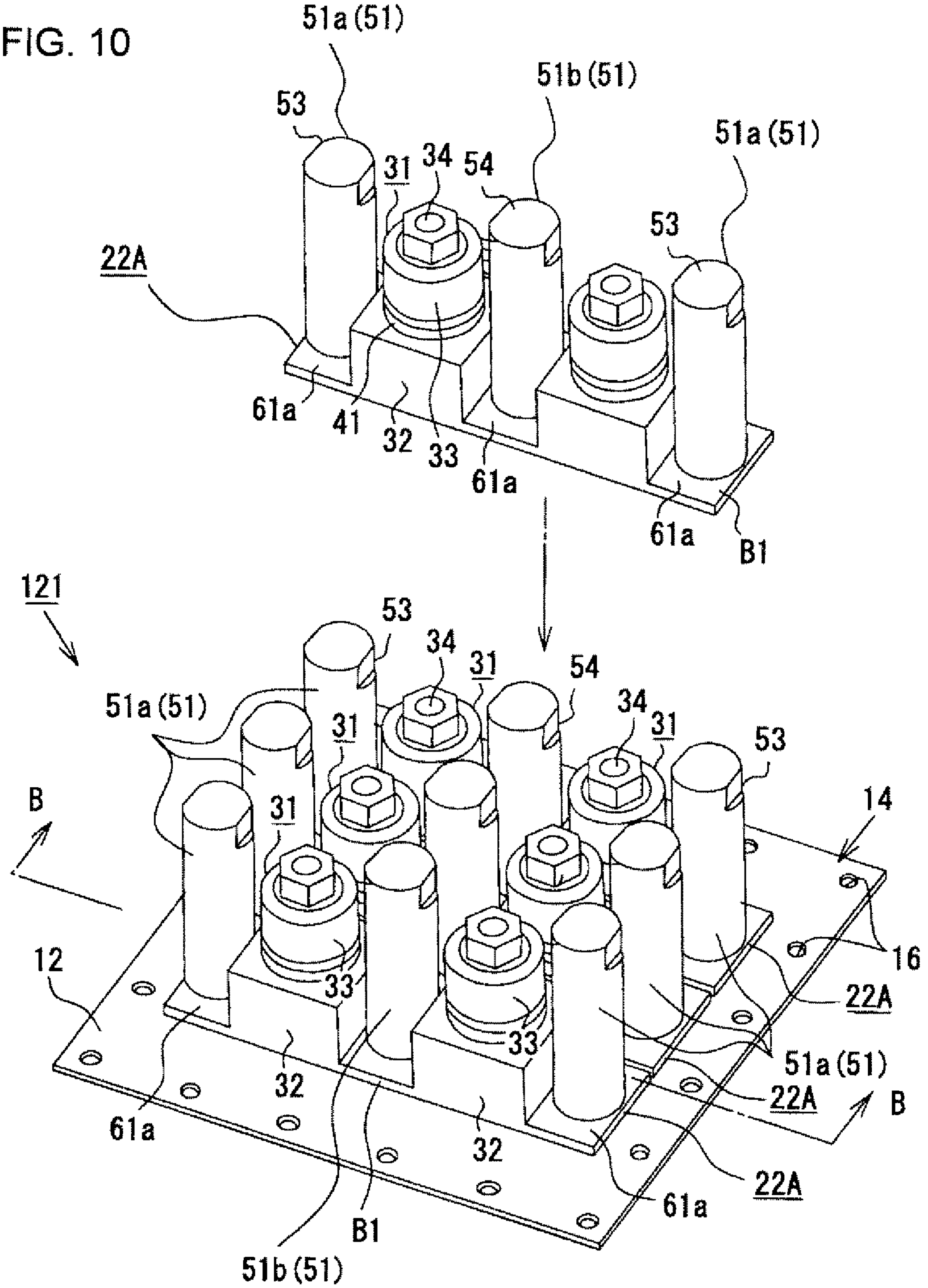
FIG. 10 is the perspective view of the diaphragm-type ultrasonic-wave irradiation unit of the second embodiment.
Figure 11:
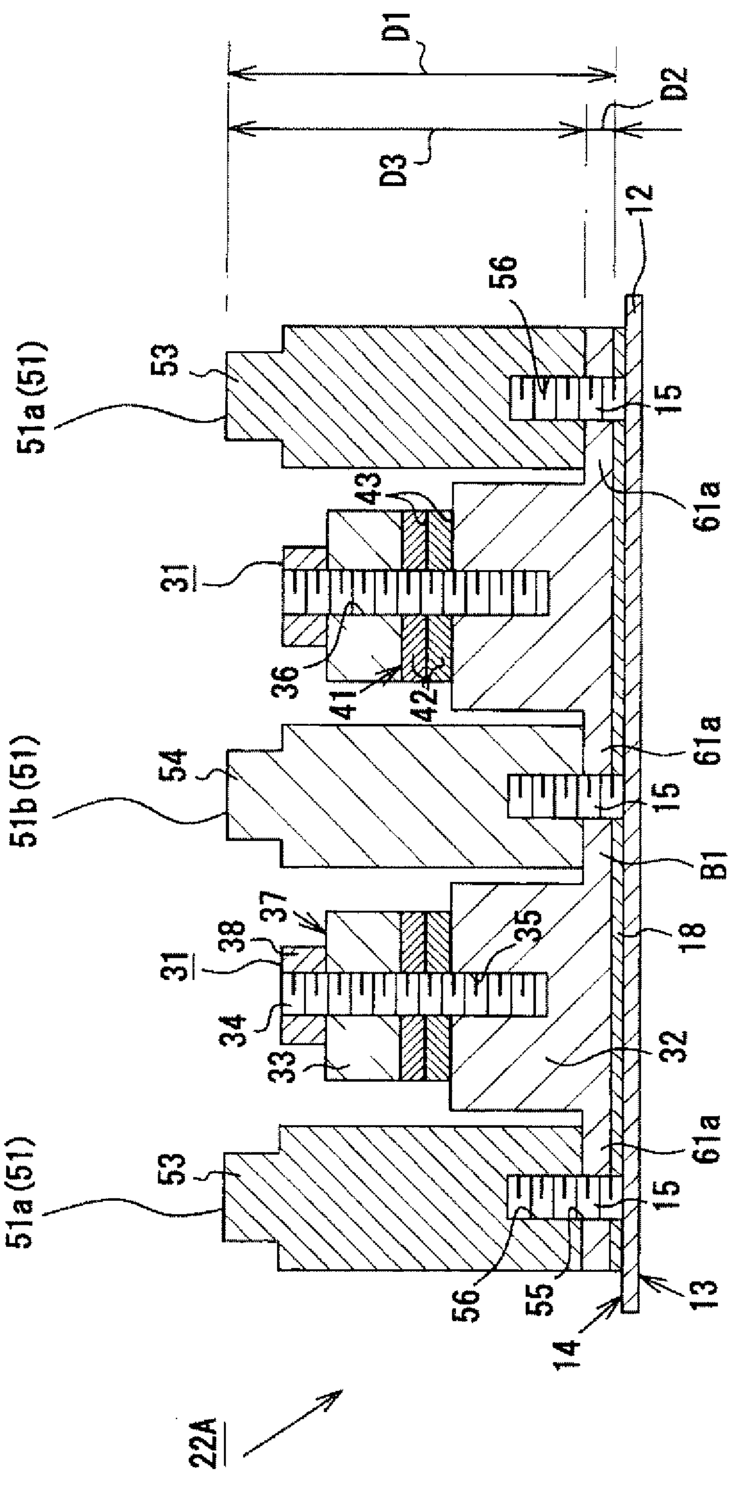
FIG. 11 is the cross-sectional view along a line B-B in FIG. 10.
Figure 12:
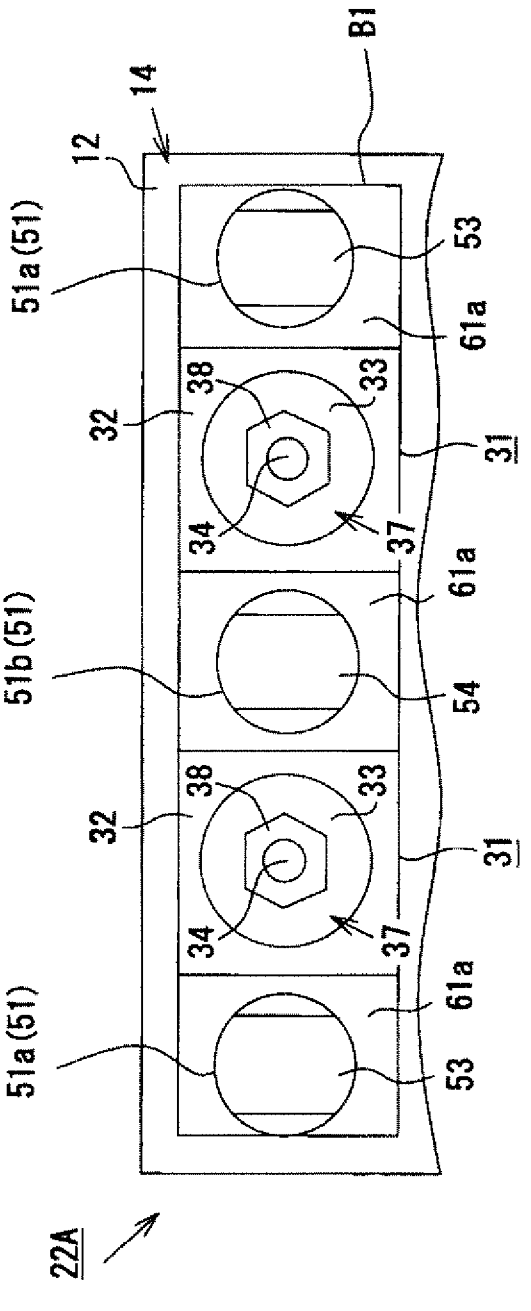
FIG. 12 is the plan view of a transducer unit constituting the ultrasonic-wave irradiation unit.
Figure 13:
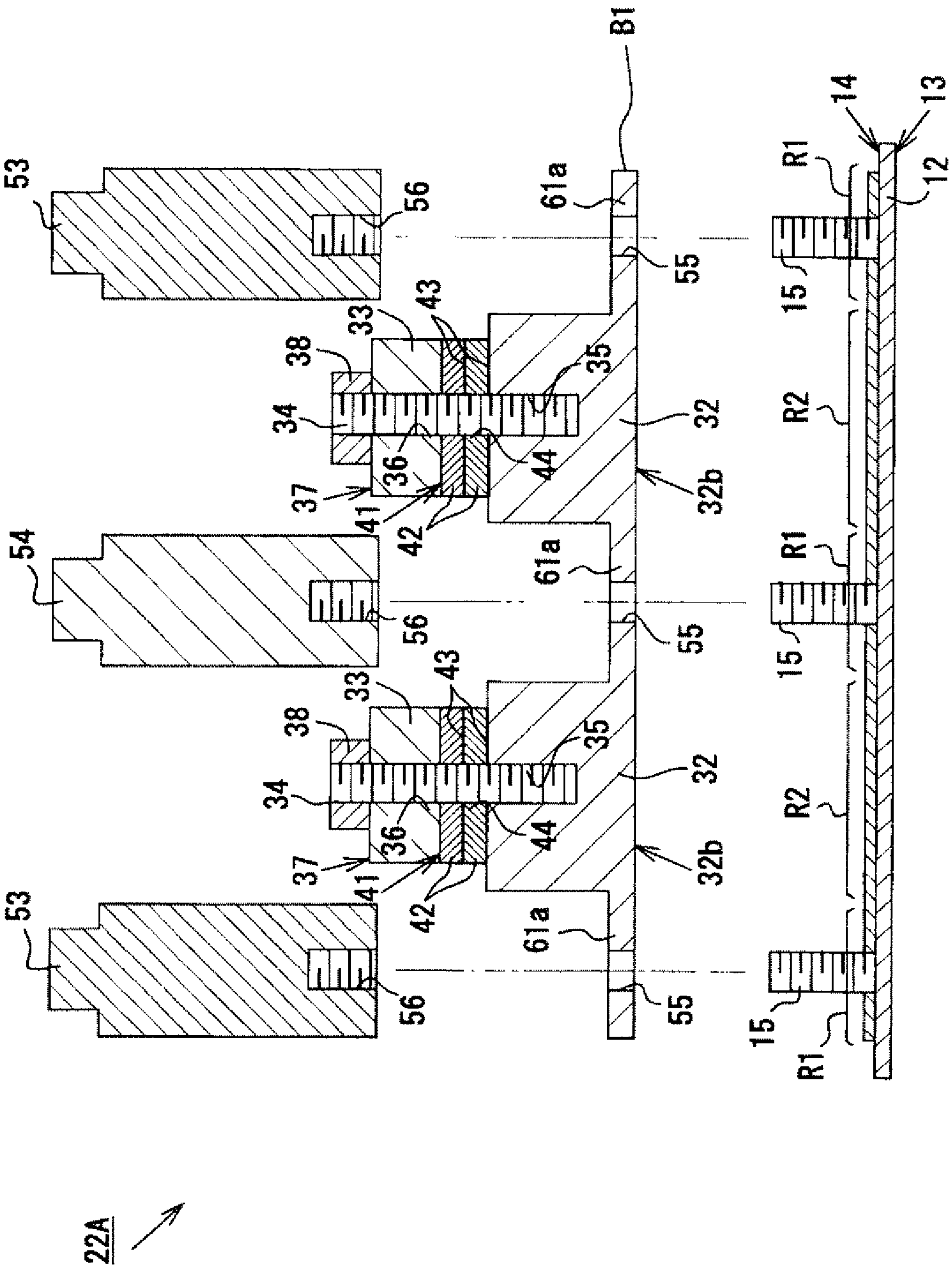
FIG. 13 is the exploded cross-sectional view of the ultrasonic-wave irradiation unit for explaining the assembly procedure.

FIG. 9(*b*) shows the analysis results of Comparative Example 2. In Comparative Example 2, the oscillation modes differed between the rear-side resonating member 54 forming the mid-positioned resonator 51*b* and the rear-side resonating member 53 forming the end-positioned resonator 51*a*. Specifically, the rear-side resonating member 54 forming the mid-positioned resonator 51*b* has less high-amplitude bending oscillations, and mainly longitudinal oscillations were excited. On the other hand, in the rear-side resonating member 53 forming the end-positioned resonator 51*a*, no longitudinal oscillations, but high-amplitude bending oscillations were excited. Therefore, it was found that Comparative Example 2 has a structure that tends to generate heat and stress fractures in the end-positioned resonator 51*a* when the oscillation level becomes high.

FIG. 9(*a*) shows the analysis results of Example. In Example, it was found that both the rear-side resonating member 53 forming the end-positioned resonator 51*a* and the rear-side resonating member 54 forming the mid-positioned resonator 51*b* have less high-amplitude bending oscillations, and mainly longitudinal oscillations were excited. Therefore, it was found that the Example has a structure that is less likely to cause heating or stress fractures in the end-positioned resonator 51*a*, regardless of the size of the oscillation level.

Therefore, according to the present embodiment, the following effects can be obtained.

(1) In the ultrasonic-wave irradiation unit 21 of this embodiment, a plurality of resonators 51 are arranged to hold the plurality of ultrasonic transducers 31 constituting the transducer array from both sides, and both the transducer front plate 32 and the front-side resonating member 52 are rectangular in plan view. Therefore, the ultrasonic transducer 31 and the resonator 51 are closely arranged to each other. As a result, a uniform oscillation distribution is easily obtained in the diaphragm 12, a uniform sound pressure distribution can be achieved, and the washing unevenness can be reduced. Also, because erosion occurring in the diaphragm 12 is reduced, the diaphragm 12 is less likely to abrase, and life prolongation of the diaphragm 12 can be achieved.

(2) In the ultrasonic-wave irradiation unit 21 of this embodiment, the transducer front plate 32 and the front-side resonating member 52 are connected through a coupler 61. A bolt insertion hole 55, through which a stud bolt 15 protruding from the non-irradiation surface 14 of the diaphragm 12 is inserted, is provided in the front-side resonating member 52. Therefore, if the rear-side resonating member 53 is screwed onto the stud bolt 15 passing through the bolt insertion hole 55, the front-side resonating member 52 is fastened and fixed to the diaphragm 12. Also, the transducer front plate 32 (and the ultrasonic transducer 31), which is connected to the front-side resonating member 52 through the coupler 61, is also fastened and fixed to the diaphragm 12. By the way, the joining strength by screwing the rear-side resonating member 53 onto the stud bolt 15 is 469 MPa, which is about 20 times the joining strength of the adhesive 18 (23 MPa). Therefore, the joining strength of the ultrasonic transducer 31 to the diaphragm 12 becomes significantly higher.

(3) According to the ultrasonic-wave irradiation unit 21 of this embodiment, the front base 71 is formed by connecting the front-side resonating member 52 and the transducer front plate 32 to each other through the coupler 61. This front base 71 is joined and fixed to the non-irradiation surface 14 of the diaphragm 12 by the adhesive strength of the adhesive 18 provided between the transducer front plate 32 and the front-side resonating member 52 and the diaphragm 12, and the fastening force of the rear-side resonating member 53, 54 to the stud bolt 15. In other words, although the part of the transducer front plate 32 of the ultrasonic transducer 31 is joined only by the adhesive strength of the adhesive 18, the part of the front-side resonating member 52 is joined and fixed not only by the adhesive strength of the adhesive 18 but also by the stronger "fastening force of the rear-side resonating members 53, 54 to the stud bolt 15". Therefore, it is possible to ensure a structure that can efficiently transmit the ultrasonic oscillation of the ultrasonic transducer 31 to the diaphragm 12 in an ideal form. In addition, the structure (front base 71) consisting of the front-side resonating member 52 and the transducer front plate 32, which are connected through the coupler 61, can be easily and reliably joined and fixed to the diaphragm 12.

(4) According to this embodiment, the resonator 51 resonates at the same frequency and longitudinal oscillation mode as the ultrasonic transducer 31. It, therefore, oscillates by the resonance phenomenon along with the oscillation of the ultrasonic transducer 31. Moreover, the resonator 51 is a metal processed part obtained by merely processing aluminum alloy or stainless steel. As such, its structure is simpler than the ultrasonic transducer 31, which consists of multiple types of parts, including ceramic piezoelectric material, and the manufacturing cost is also lower. Therefore, by placing the resonator 51 separately from the ultrasonic transducer 31, instead of placing a large number of ultrasonic transducers 31 on the diaphragm 12, the ultrasonic-wave irradiation unit 21 can be realized at a low cost.

(5) According to this embodiment, the front-side resonating member 52 is arranged in contact with the bolt protrusion region R1, and the front plate 32 of the ultrasonic transducer 31 is arranged in contact with the non-protruding bolt region R2. As a result, the transducer front plate 32 is arranged in a state where it is in face-to-face contact with a "flat surface without obstacles" on the non-irradiation surface 14 of the diaphragm 12. Therefore, the ultrasonic oscillation generated by the ultrasonic transducer 31 itself can be efficiently transmitted to the diaphragm 12 in an ideal form. In addition, each front face of the transducer front plate 32, the front-side resonator 52, and the coupler 61 (the front face of the front base 71) is joined to the non-irradiation surface 14 in a flat state. Thus, ultrasonic waves can be uniformly irradiated from its front face. Therefore, the irradiation area can be made larger than that of the conventional ultrasonic transducer.

(6) According to this embodiment, among the rear-side resonating member 53 forming the end-positioned resonator 51*a* and the rear-side resonating member 54 forming the mid-positioned resonator 51*b*, the rear-side resonating member 53 forming the end-positioned resonator 51*a* is made of metal material with a higher bending rigidity than the front-side resonating member 52. Thus, the bending strength of the part of the rear-side resonating member 53, where a large bending stress is likely to be applied during oscillation, can be increased, and bending oscillation can be effectively suppressed. Therefore, it is possible to prevent heating and stress fracture of the rearside resonating member 53 and to maintain the resonance performance required for the resonator 51, thus making it possible to realize a highly practical ultrasonic-wave irradiation unit 21 with this configuration.

Second Embodiment

Next, the ultrasonic irradiation unit 121, which is a second embodiment embodying the present invention, will be described in detail based on FIG. 10 to FIG. 13. Only the structure that differs from the ultrasonic-wave irradiation unit 21 of the first embodiment will be explained here. The same reference numerals will be given for the common structures, and a detailed explanation will be omitted.

As shown in FIG. 10 to FIG. 13, the ultrasonic-wave irradiation unit 121 of this embodiment has a shape different from the front-side resonating member 52 for the first embodiment. Specifically, in this embodiment, the front-side resonating member 61*a* is formed with a wide rectangular plate-shaped part (connection part) that also functions as a coupler connecting the side surfaces of the transducer front plate 32. This front-side resonating member 61*a* is considerably thinner than the front-side resonating member 52 of the first embodiment. On the other hand, the rear-side resonating members 53 and 54 of this embodiment are formed considerably longer than those in the first embodiment. The rear face of the front-side resonating member 61*a*, which also serves as a coupler, and the front face of the rear-side resonating members 53 and 54, are arranged in a state of being in surface contact with each other. Also, in this case, the short side of the front-side resonating member 61*a* is formed to be approximately equal to the outer diameter of the rear-side resonating members 53 and 54. Then, a resonator 51 capable of integral oscillation is created by these front-side resonating member 61*a* and rear-side resonating members 53 and 54.

When assembling this ultrasonic-wave irradiation unit 121, an aluminum alloy block is first processed to create a front base B1, consisting of a transducer front plate 32 and a front-side resonating member 61*a* that also functions as a coupler. In this case, there is no need to form a narrow cutout groove M1 between the transducer front plates 32. Next, after assembling the ultrasonic transducer 31, similarly, in the first embodiment, a diaphragm 12 with welded stud bolts 15 is prepared, and adhesive 18 is applied to its non-irradiation surface 14. Then, the transducer unit 22A is externally inserted into the stud bolts 15 of the diaphragm 12. In this state, by screwing the rear-side resonating members 53 and 54 onto the tip of the stud bolts 15 protruding from the front-side resonating member 52, ultrasonic-wave irradiation unit 121 is completed.

Even with the ultrasonic-wave irradiation unit 121 configured as described above, it can reduce the erosion and cleaning unevenness generated on the diaphragm 12. It can enhance the joining strength of the ultrasonic transducer 31 to the diaphragm 12, similar to the first embodiment. In addition, it can suppress bending oscillation that occurs in the rear-side resonating members 53 and 54 during oscillation. Moreover, it is possible to manufacture the front base B1 without performing narrow groove processing in this embodiment. This simplifies the manufacturing process, potentially reducing the manufacturing cost, because of which the production cost of the ultrasonic-wave irradiation unit 121 can be reduced.

The above embodiment may be modified as follows.

Figure 14:
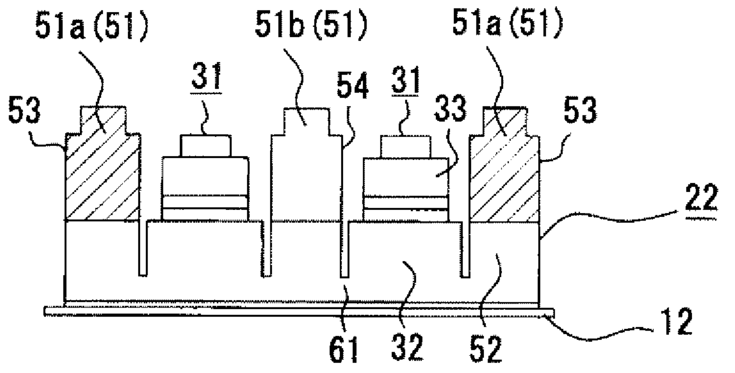
FIG. 14 (*a*) to FIG. 14 (*c*) are the schematic front views of a transducer unit of another embodiment.
Figure 14:
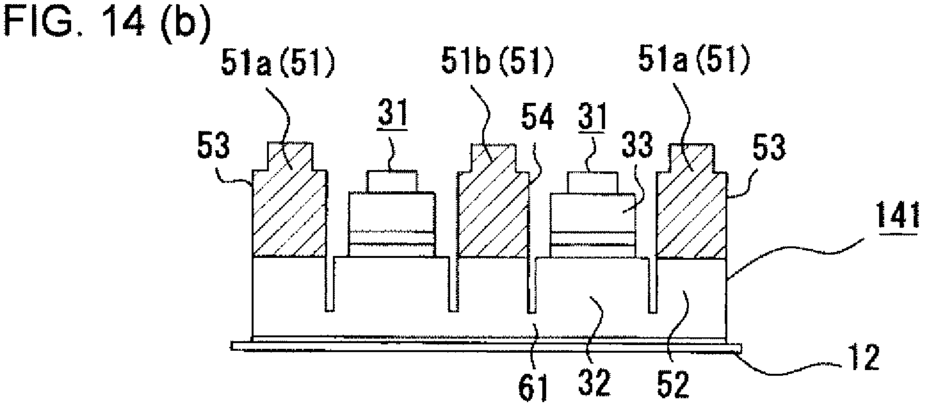
Figure 14:
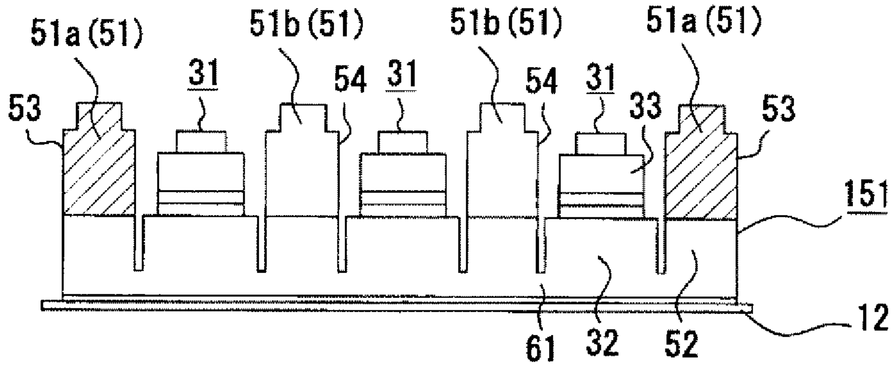
Figure 15:
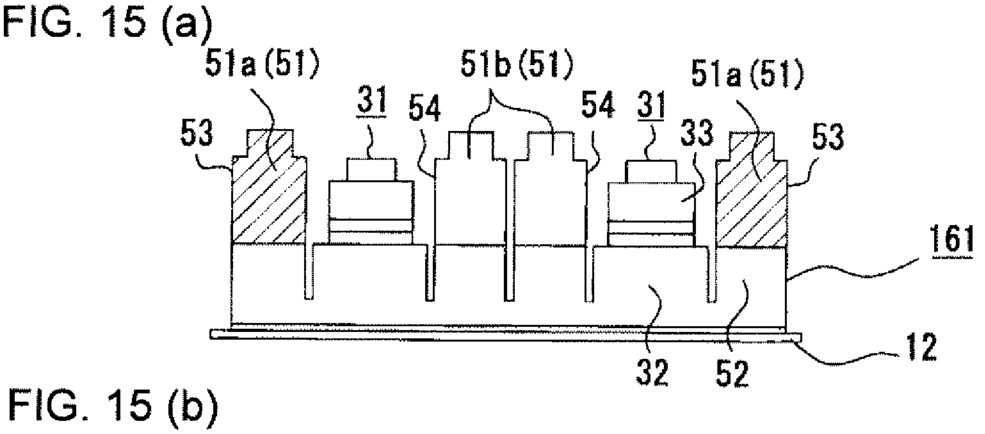
FIG. 15 (*a*) and FIG. 15 (*b*) are the schematic front views of a transducer unit of another embodiment.
Figure 15:
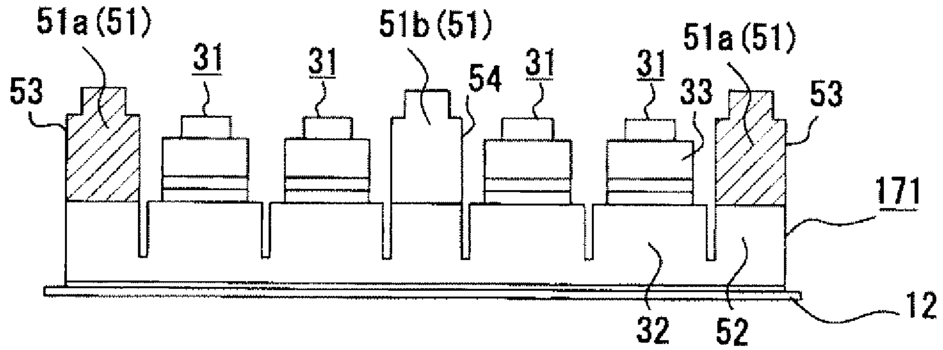
Figure 16:
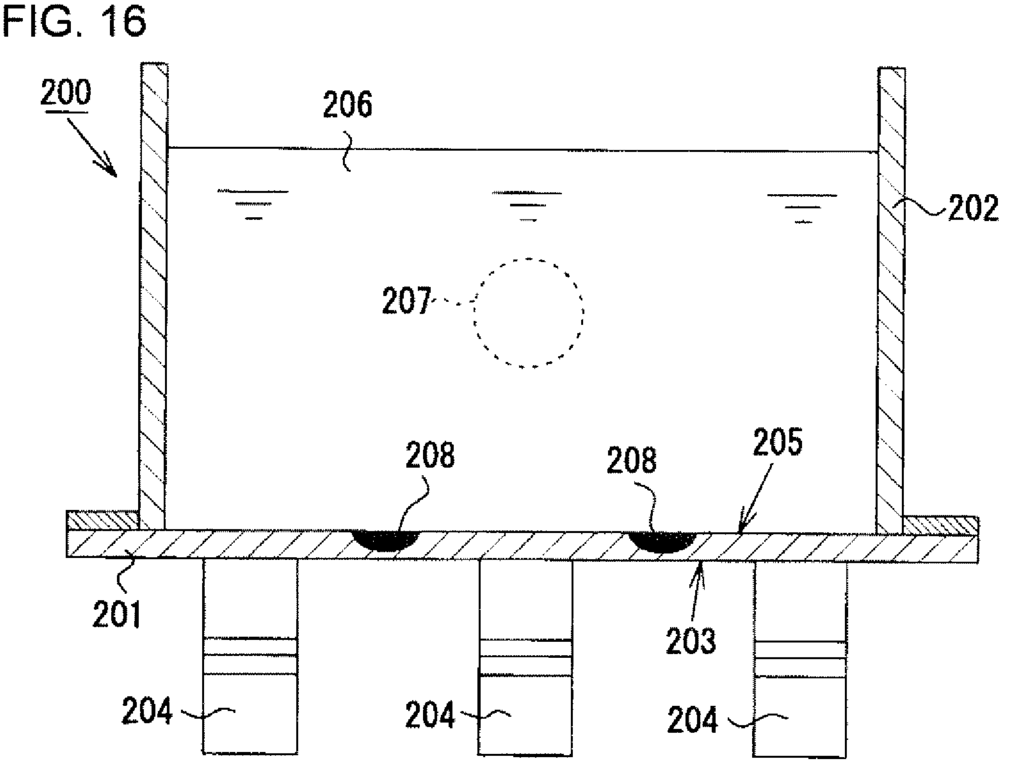
FIG. 16 is the schematic configuration diagram of a conventional ultrasonic cleaning device.

According to the transducer unit 22 of the above embodiment, three resonators 51 and two ultrasonic transducers 31 are alternately arranged in a column, and two rearside resonating members 53 constituting the end-positioned resonator 51*a* are made of stainless steel (refer to FIG. 14(*a*)), but this is not limited. For example, as in another embodiment of the transducer unit 141 shown in FIG. 14(*b*), not only the rear-side resonating members 53 that make up the end-positioned resonator 51*a*, but also the rearside resonating members 54 that make up the mid-positioned resonator 51*b* may be made of stainless steel. Also, as in another embodiment of the transducer unit 151 shown in FIG. 14(*c*), four resonators 51 and three ultrasonic transducers 31 may be alternatively arranged in a column, and two rear-side resonating members 53 constituting the end-positioned resonator 51*a* may be made of stainless steel. Furthermore, as in another embodiment of the transducer unit 161 shown in FIG. 15 (*a*), four resonators 51 and two ultrasonic transducers 31 may be arranged in a column, and two rear-side resonating members 53 that make up the end-positioned resonator 51*a* may be made of stainless steel. That is, the resonators 51 and the ultrasonic transducers 31 may not have to be alternatively arranged, and the resonators 51 can be arranged continuously. Also, as in another embodiment of the transducer unit 171 shown in FIG. 15(*b*), three resonators 51 and four ultrasonic transducers 31 may be arranged in a column, and two rear-side resonating members 53 that make up the end-positioned resonator 51*a* may be made of stainless steel. That is, the resonators 51 and the ultrasonic transducers 31 may not have to be alternatively arranged, and the ultrasonic transducers 31 can be arranged continuously. In FIG. 8(*a*) to FIG. 8(*c*) and FIG. 9(*a*) and FIG. 9(*b*), for convenience of explanation, it is shown by hatching that the member is made of stainless steel. In these other embodiments, instead of the stainless steel used, it is, of course, possible to use, for example, an iron-based metal or a titanium alloy, which is also a metal with high bending rigidity (Young's modulus is 100 GPa or more).

For example, the outer diameter of the rear-side resonating members 53 and 54 that constitute the resonator 51 may be made thicker than those of the first and second embodiments. If formed in this way, the bending oscillation occurring in the resonator 51 can be more reliably reduced.

According to the above embodiment, the stud bolt 15, which is a bolt without a head, is used as the bolt projecting from the non-irradiation surface 14 of the diaphragm 12. However, bolts with heads, such as hexagon bolts, hexagon socket bolts, and butterfly bolts, can also be used as bolts projecting from the non-irradiation surface 14.

The ultrasonic cleaning device 10 of the above embodiment is a type in which the ultrasonic-wave irradiation unit 21 is attached to the bottom of the cleaning tank 11 through a packing 1 and is fixed by a bolt 2 and a nut 3, but this is not necessarily the only possible configuration. For example, an ultrasonic cleaning device could be a type of device in which the transducer unit 22 is externally inserted onto the stud bolt protruding from the non-irradiation surface after adhesive is applied to the non-irradiation surface of the bottom plate of the cleaning tank. The rear-side resonating member 53 is screwed onto the protruding part of the stud bolt through which the transducer unit 22 has been inserted, thus joining the transducer unit 22. The ultrasonic cleaning device may also be configured using a throw-in type of ultrasonic-wave irradiation unit that is used by being thrown into the cleaning liquid W1 in the cleaning tank 11. In this case, the throw-in type of ultrasonic-wave irradiation unit has a structure in which an adhesive is applied to the non-irradiation surface inside a waterproof case, a stud bolt is protruded, and the transducer unit 22 is externally inserted onto the stud bolt. The rear-side resonating member 53 is screwed onto the stud bolt, thus joining the transducer unit 22.

The ultrasonic-wave irradiation unit 21 of the above embodiment was applied to the ultrasonic cleaning device 10 that uses ultrasonics to perform cleaning. Still, it may also be applied to devices that perform processes other than cleaning, such as extraction, emulsification, dispersion, mixing, stirring, crushing, atomization, etc. Specifically, when the ultrasonic-wave irradiation unit is applied to an ultrasonic emulsification device, it can finely process the emulsion into nano-sized particles with high efficiency, which could allow for long-term stabilization, reduction of surfactants, and other effects. Additionally, when the ultrasonic-wave irradiation unit is applied to an ultrasonic dispersion device, it can efficiently disperse nanoparticles (metal nanoparticles, carbon nanotubes, ceramic nanoparticles, magnetic nanoparticles, etc.). Furthermore, the ultrasonic-wave irradiation unit may be embodied as an ultrasonic processing device that utilizes chemical action. In this case, since cavitation can be generated uniformly and efficiently over a wide range, it is possible to increase the amount of radicals such as OH radicals generated by the high-temperature and high-pressure field at the time of bubble burst. Therefore, it is possible to enhance the reaction efficiency of sonochemical reactions caused by radical species and efficiently perform treatments such as decomposition and harmless treatment of harmful substances, sterilization, and high-polymer polymerization.

Besides the technical ideas of the present invention, as described above, other technical ideas to be understood are described hereinafter.

(1) In the first aspect of the present invention and the like, all the rear-side resonating members forming the end-positioned resonator and the rear-side resonating members forming the mid-positioned resonator are made of a metal material having greater bending rigidity than the front-side resonating member.

(2) In the first aspect of the present invention and the like, the transducer front plate and the front-side resonating member are joined to the non-irradiation surface of the diaphragm via an adhesive.

(3) In the first aspect of the present invention and the like, the front-side resonating member is positioned in contact with the bolt protruding area on the non-irradiation surface, while the ultrasonic transducer is positioned in contact with the bolt non-protruding area adjacent to the bolt protruding area on the non-irradiation surface, and the front-side resonating member and the transducer front plate connected via the coupler are joined to the non-irradiation surface of the diaphragm by the adhesive force of the adhesive provided between the transducer front plate and the non-irradiation surface of the front-side resonating member and of the diaphragm, and by the tightening force of the rear-side resonating member against the bolt.

(4) In the first aspect of the present invention and the like, the transducer front plate, the front-side resonating member, and the coupler are integrally formed.

(5) In the first aspect of the present invention and the like, the ultrasonic transducer is a longitudinal oscillation type of transducer that oscillates in a longitudinal oscillation mode, and the resonator is a resonator that resonates at the same frequency and in the longitudinal oscillation mode as the ultrasonic transducer.

(6) An ultrasonic-wave irradiation unit characterized by comprising; a diaphragm having an irradiation surface that radiates ultrasonic waves, and a non-irradiation surface located on the opposite side of the irradiation surface, with a bolt protruding on the non-irradiation surface; a bolted Langevin type ultrasonic transducer in which a transducer front plate is joined to the non-irradiation surface; a front-side resonating member having a wide flat plate-shaped part (connecting plate) functioning as a coupler connecting the side surfaces of the transducer front plate, a bolt through-hole through which the bolt is inserted is provided and is joined to the non-irradiation surface; and a rear-side resonating member which is provided at the tip of the bolt to be tightened and fixed in a state where the front-side resonating member is held between the diaphragms, wherein the transducer front face forms a rectangular shape in plan view, and the resonator is formed by the front-side resonating member serving also as the coupler and the rearside resonating member.

DESCRIPTION OF REFERENCE NUMERALS

12: Diaphragm
13: Irradiation surface
14: Non-irradiation surface
15: Stud bolt as a bolt
18: Adhesive
21, 121: Ultrasonic-wave irradiation unit
22, 22A, 141, 151, 161: Transducer units
31: Ultrasonic Transducer
32: Transducer front plate
51: Resonator
51*a*: End-positioned resonator as a resonator
51*b*: Mid-positioned resonator as a resonator
52, 61*a*: Front-side resonating member
53, 54: Rear-side resonating member
55: Bolt insertion hole
61: Coupler
D1: Length in the height direction of the resonator
D3: Length in the height direction of the rear side resonating member

The invention claimed is:

1. An ultrasonic-wave irradiation unit comprising;

a diaphragm having an irradiation surface that irradiates ultrasonic waves, and a non-irradiation surface located on the opposite side of the irradiation surface, with a bolt protruding from the non-irradiation surface;

a bolted Langevin-type ultrasonic transducer in which a transducer front plate is joined to the non-irradiation surface;

a front-side resonating member joined to the non-irradiation surface and having a bolt insertion hole through which the bolt is inserted; and a rear-side resonating member is provided separately from the front-side resonating member at the tip of the bolt and is fastened and fixed to the bolt in a state where the front-side resonating member is held between the rear-side resonating member and the diaphragm, wherein the front-side resonating members and the rear-side resonating members constitute multiple resonators capable of integral oscillation, the side surface of the transducer front plate and the side surface of the front-side resonating member are connected to each other via a coupler that transmits the oscillation of the ultrasonic transducer to the resonators, multiple resonators, together with multiple ultrasonic transducers, are arranged in a column, consisting of end-positioned resonators located at the ends of the column and mid-positioned resonator located in the middle of the column, among the rear-side resonating members constituting the end-positioned resonators and the mid-positioned resonators, at least the rear-side resonating member constituting the end-positioned resonators is formed using a metal material with greater bending rigidity than the front-side resonating member.

2. An ultrasonic-wave irradiation unit, according to claim 1, wherein the rear-side resonating member that constitutes the end-positioned resonator is formed using metal material with Young's modulus of 100 GPa or more.

3. An ultrasonic-wave irradiation unit, according to claim 1, wherein the rear-side resonating member that constitutes the end-positioned resonator is formed using a metal material with Young's modulus of 100 GPa or more, and the front-side resonating member, the transducer front plate and the coupler are formed using a metal material that is less dense and has a higher thermal conductivity than the metal material used in the rear-side resonating member that forms the end-positioned resonator.

4. An ultrasonic-wave irradiation unit, according to claim 1, wherein the length in the height direction of the rear-side resonating member is ¼ or more of the length in the height direction of the resonator, of which a front face of the rear-side resonating member and a rear face of the front-side resonating member make contact with each other.

* * * * *